Oct. 12, 1954    D. M. FINCKE    2,691,207
METHOD OF MAKING WHEELS
Filed Dec. 29, 1950    2 Sheets-Sheet 1
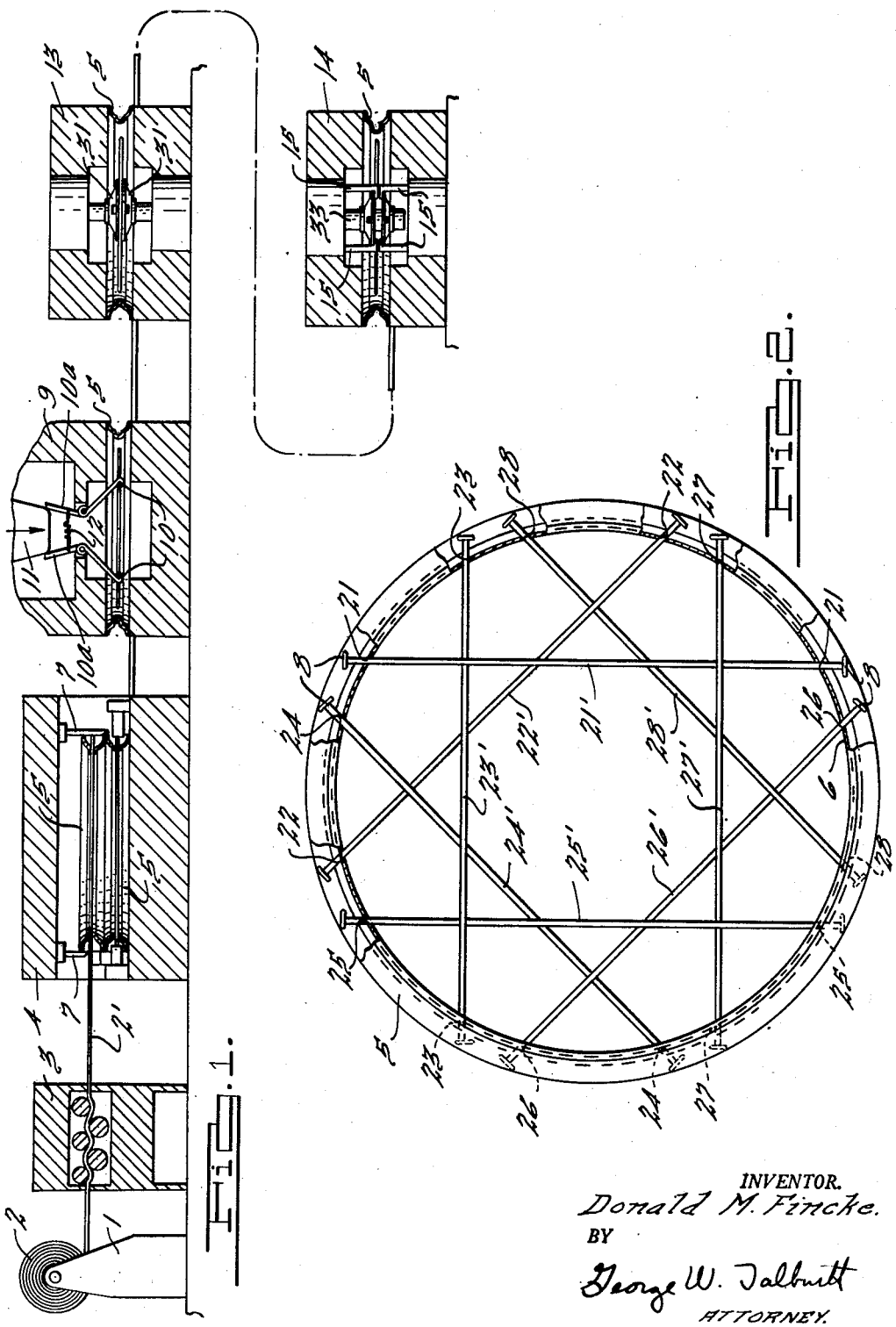
INVENTOR.
Donald M. Fincke.
BY
George W. Talbutt
ATTORNEY.

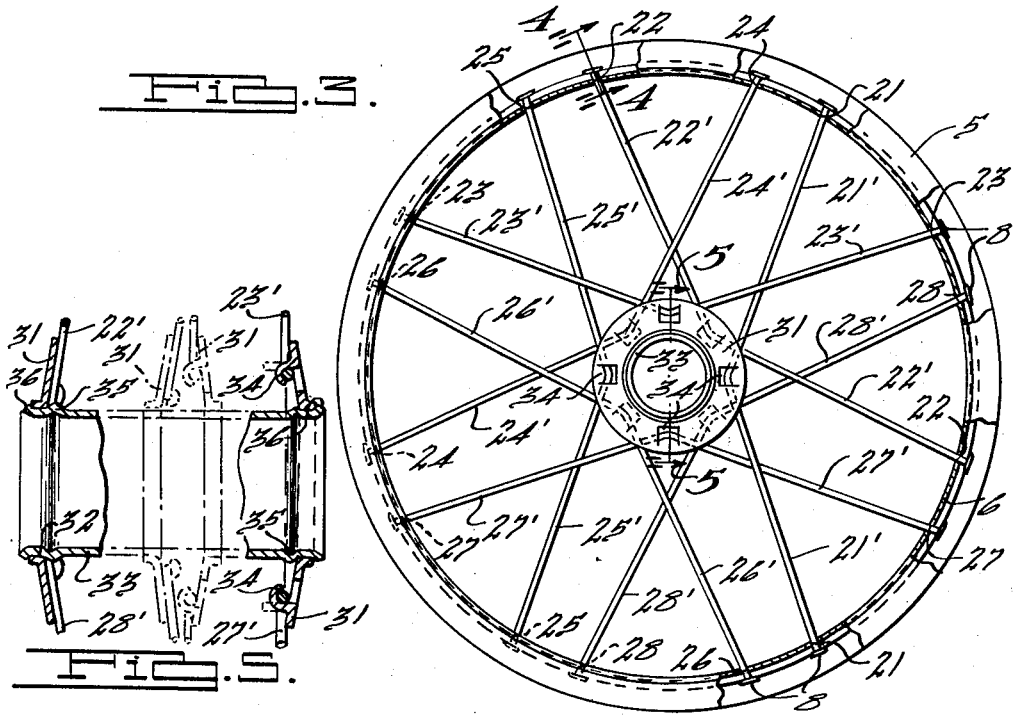

Patented Oct. 12, 1954

2,691,207

UNITED STATES PATENT OFFICE 2,691,207

METHOD OF MAKING WHEELS

Donald M. Fincke, Woodstock, Conn.

Application December 29, 1950, Serial No. 203,388

2 Claims. (Cl. 29—159.02)

This invention relates to an improved type of spoked wheel and to the novel method of making the wheel.

It is a primary object of this invention to produce an improved type of spoked wheel by a method that lends itself to the use of automatic machinery.

It is a further object of this invention to produce an improved type of spoked wheel by a method that successively straightens the spoke forming wire, then inserts the straightened wire through pairs of aligned, circumferentially spaced, spoke holes in the rim to provide a plurality of rim chords, next cuts the spoke wires to proper length and thereafter forms heads on the opposite ends of the wires, then bends the straight, chord-like, spoke wires to positions whereby a plurality of substantially radially extending wheel spokes are provided, thereafter mounts hub disks or washers on the hub portions of the several wheel spokes, next inserts a tubular bearing sleeve through the bores in the hub washers, then separates the hub washers axially along the bearing sleeve so as to simultaneously and uniformly tension all of the wheel spokes, and finally stakes the separated hub washers to the bearing sleeve with the spokes properly and uniformly tensioned.

It is another object of this invention to provide an improved type of spoked wheel by a most economical method of manufacture and one that is particularly adapted for the high speed mass production of wheels.

It is still another object of this invention to provide an improved type of spoke wheel wherein the spoke may be formed from a plurality of similar straight wires or from a continuous length of wire laced through aligned pairs of holes in the spoke rim and thereafter bent to substantially radially extending positions.

Other objects and advantages of this invention will become apparent from a reading of the following description of the invention and a consideration of the related drawings wherein:

Fig. 1 is a diagrammatic view of the several steps involved in the making of a spoked wheel in accordance with the method herein set forth;

Fig. 2 is a side elevation of a partially completed spoked wheel that has been formed in accordance with this method, portions of the wheel being broken away and shown in section to more clearly disclose the spoke ends;

Fig. 3 is a side elevation of a completed wheel formed in accordance with this method portions being broken away and shown in section;

Fig. 4 is a fragmentary sectional elevational view taken along the line 4—4 of Fig. 3;

Fig. 5 is a fragmentary sectional elevational view taken along the line 5—5 of Fig. 3, with broken lines indicating the arrangement of the hub washers on the bearing sleeve prior to tensioning of the wheel spokes by axial separation of the hub washers; and Fig. 6 is a side elevational view of a partially completed spoked wheel representing a modified form of the invention.

Spoked wheels of the type herein disclosed have generally been produced by threading sets of hairpin shaped spoke wires through pairs of holes in the wheel rim and thereafter connecting the free ends of the spoke wires to pairs of hub disks. Subsequently the hub disks are separated to simultaneously tension the several spoke wires (see U. S. Patent 2,511,141 to H. W. Zimmerman). Such a method of wheel manufacture requires a large amount of hand labor that is relatively costly and time consuming. The method of wheel manufacture herein disclosed is designed to utilize automatic machinery and to thereby eliminate a large majority of the previously required hand labor and, at the same time, to materially speed up the wheel producing operation.

Fig. 1 of the drawings diagrammatically illustrates my continuous wheel making process wherein an arbor 1 rotatably supports a coil of spoke forming wire 2. Wire drawn from the coil 2 is passed through a roller type of wire straightening machine 3. The straightened wire 2' leaving the straightening machine 3 is next passed into a spoke forming machine 4. Mounted in the spoke forming machine 4 are a number of vertically stacked, horizontally disposed, wheel rims 5, 5. The wheel rims 5 preferably are of a curved cross-sectional contour as clearly shown in Fig. 4. The central or medial portion of the rims 5 are preferably depressed as at 6 and provided with circumferentially spaced apart pairs of spoke receiving holes such as the holes 21, 21 and 22, 22 etc.

The wire 2' is fed into a pair of oppositely disposed holes in the rim 5 such as the holes 21, 21 to form the spoke 21'. The spoke 21' at this point provides a rim chord between the holes 21, 21. Next the wire cutting and head forming elements 7, 7 of the machine 4 are actuated to cut the wire 2' to proper spoke length and to simultaneously form enlarged heads 8, 8 on opposite ends of the spoke wires 21'. It will be noted from Fig. 2, which shows a wheel after it has been ejected from the machine 4, that the spokes 21'—28' that are formed in the machine 4 are of a slightly greater length than the distance between the pairs of holes through which the several spokes are threaded. The excess length of the spokes 21'—28' is to provide sufficient spoke material for the subsequent bending of the spokes to their substantially radially extending final positions. The excess spoke length at this stage of the process also provides sufficient spoke material to permit the spokes on opposite sides of the wheel to be axially separated during the tensioning of the spokes without unduly stressing the spokes or the attached rim 5.

After the spoke 21' has been inserted in the rim 5 and formed with the heads 8, 8 the machine 4 indexes the rim to a new pair of holes such as the holes 22, 22 after which the wire 2' is inserted in the holes 22, 22 and the spoke 22' formed in the same manner as the spoke 21'. This process is carried on until all spokes of the wheel have been formed whereupon the wheel, in the condition shown in Fig. 2, is ejected from the machine 4 and is ready to be passed to machine 9.

It will be noted from a study of Fig. 2, that the four spokes 21', 23', 25' and 27' are inserted in the rim holes so that they are each disposed on one side of the rim whereas the spokes 22', 24', 26' and 28' are inserted in the rim holes so that they are each disposed on the other side of the rim. This spoke arrangement is important for in a subsequent step in the process of manufacturing the wheel, the spokes on one side of the rim are separated from those on the opposite side of the rim during the step that simultaneously tensions all of the spokes. Obviously if the spokes are not properly inserted in the rim they would cross each other improperly and they could not be separated in the required manner.

When the wheel is ejected from the spoke inserting machine 4 in the condition shown in Fig. 2, it is next passed to the spoke forming machine 9. Machine 9 has a plurality of pivotally mounted claw fingers 10 that are adapted to be drawn radially inwardly when the tapered ram 11 is moved downwardly into engagement with the lever ends 10a of the claws 10. The spring 12 tends to spread the claws 10 apart when the ram 11 is retracted upwardly. Obviously the claws 10 will have to be applied to the spokes on both sides of the wheel. The spoke forming machine 9 may have but a single set of claws as shown and the wheel rim may be turned over to form the spokes on the other side of the wheel or the machine may have an upper and a lower set of claws 10 to provide means for simultaneously forming the spokes on the opposite sides of the wheel.

Operation of the machine 9 causes the claws 10 to engage the mid-lengths of the straight spoke wires of the wheel shown in Fig. 2 and to bend these mid portions of the spokes radially inwardly until they reach positions such as the positions shown in Fig. 3.

After the spoke wires have been bent to their substantially radially extending positions as shown in Fig. 3 the wheel is passed to the machine 13 where the hub disks 31 are applied to the spokes on opposite sides of the wheel. The hub disks 31 have a central bore 32 to receive the tubular bearing sleeve 33. Also, the hub disks 31 are lanced to provide a plurality of circumferentially spaced tabs 34. Tabs 34 are adapted to be anchored to the inwardly bent midportions of the several spokes. From Fig. 5 it will be noted that the tabs 34 of the hub disks 31 initially extend substantially perpendicular to the disks 31 as shown by the broken lines. This arrangement of the tabs 34 permits the tabs to be easily mounted over the midportions of the spoke wires and thereafter the tabs 34 are clinched about the spoke wires to their final full line position (see Fig. 5).

After connection of the hub disks 31 to mid portions of the wheel spokes, then the wheel is passed to the spoke tensioning machine 14. In the machine 14 the tubular bearing sleeve 33 is first passed through the aligned bores 32 in the opposed pair of hub disks 31. At this point the hub disks are in substantially face to face arrangement as shown in broken lines in Fig. 5. After mounting of the bearing sleeve 33 in the bores 32 of the hub disks 31, then the fingers 15, 15 of the spoke tensioning machine 14 are separated and this axially spaces apart the hub disks 31 along the bearing sleeve 33. In axially separating the disks 31 on the sleeve 33, the wheel spokes are all simultaneously tensioned to a more or less uniform degree. When the disks 31 have been properly spaced apart to produce the required degree of spoke tension, then the disks 31 are staked in position by the bead formations 35 and the turned up end edges 36 formed on the opposite ends of the sleeve 33. When the wheel leaves the spoke tensioning machine 14 it is in the completed form shown in Fig. 3 with all spokes securely anchored in position and uniformly tensioned. Furthermore the wheel has been produced by a process that lends itself to economical, high speed production.

It is also possible to form the spokes of the wheel shown in Figs. 1–5 from a single continuous length of wire fed successively through the several sets of holes in the rim 5 as the rim 5 is indexed by a suitable supporting machine.

In the Fig. 6 form of the invention there is shown a modified form of U-shaped or hairpin type spoke 51—54 having the legs thereof inserted through aligned pairs of holes 61a, 61b—68a, 68b in the rim 65. After insertion of the spoke wires 51—54 in the rim 65. the free ends of the spoke wire legs have the head 66 formed thereon. After this hub disks, such as the hub disks 31, are applied to the spoke wires on opposite sides of the wheel in the same manner as already described with regard to the Figs. 1–5 form of the invention. Following the mounting of the hub washers on the spoke wires a bearing sleeve, such as the bearing sleeve 33 of Figs. 1–5, is mounted in the bores of the hub washers and then the hub washers are separated to uniformly tension the spoke wires. When the spokes have been properly tensioned then the hub washers are staked to the bearing sleeve. In this form of the invention it is not necessary to bend the spoke wires to radially extending positions for the wires are already of such an arrangement. It will be noted that the spoke wires 51 and 52 are inserted in the rim so as to be positioned on one side of the wheel while the spoke wires 53 and 54 are inserted in the rim 65 so as to be positioned on the other side of the wheel.

It is to be understood that Fig. 1 is merely a diagrammatic showing of the method of forming a spoked wheel in accordance with this invention. In actual practice it is foreseeable that the various wheel forming steps may be successively carried out in one or more machines that are each adapted to accomplish several different steps of the process.

While the specific methods of wheel assembly hereinbefore described are based on the novel spoke forming process herein disclosed, still, it is possible to somewhat vary the assembly process and still remain within the scope of this invention. For instance, first the spokes on one side of the wheel could be formed and attached to a hub washer 31, next the bearing sleeve 33 with the other hub washer 31 could be connected to the first assembled hub washer 31, and thereafter the spokes on the other side of the wheel could be formed and connected to the last mentioned hub washer 31. It is to be understood that the connecting of the spokes to the hub washers and the axial separation of the washers tensions the spokes uniformly. It is thought to be obvious that this last described process of wheel assembly is also based on the novel spoke forming process herein disclosed.

I claim:

1. A method of making a spoked wheel comprising the successive steps of inserting substantially straight spoke forming elements through aligned pairs of holes in a wheel rim so as to provide a plurality of rim chords of a length slightly greater than the chordal distance between the respectively connected rim points, forming the ends of the spoke forming elements with means loosely anchoring said spoke forming elements in said rim, bending the mid-portions of said spoke forming elements radially inwardly towards the hub center of the wheel, mounting a hub washer on the inwardly bent mid-portions of the spoke forming elements at each side of the wheel with certain of the spoke forming elements connected to each washer, inserting a hub sleeve through the bores of the hub washers, separating the hub washers axially along the sleeve to simultaneously tension the spoke forming elements, and anchoring the hub washers to the sleeve in axially spaced apart relationship.

2. A method of making a spoked wheel comprising the successive steps of inserting substantially straight spoke forming elements through aligned pairs of holes in a wheel rim so as to provide a plurality of rim chords, loosely anchoring said spoke forming elements in said rim, bending the mid-portions of said spoke forming elements at one side of the wheel radially inwardly towards the center of the rim, mounting a first hub washer on the inwardly bent mid-portions of the spoke forming elements at the said one side of the wheel, mounting a hub sleeve and a second hub washer on the first mentioned hub washer with the second hub washer axially spaced along the sleeve from the first hub washer, thereafter bending the mid portions of the spoke forming elements on the other side of the wheel radially inwardly towards the center of the rim, connecting the radially inwardly bent mid portions of the spoke forming elements on the other side of the wheel to the second hub washer, axially separating the hub washers on the sleeve so as to simultaneously tension the several spoke forming elements, and thereafter anchoring the hub washers to the sleeve in axially spaced apart relationship.

References Cited in the file of this patent

UNITED STATES PATENTS

| Number | Name | Date |
| --- | --- | --- |
| 306,450 | Williams | Oct. 14, 1884 |
| 319,452 | Carr | June 9, 1885 |
| 380,358 | Smith et al. | Apr. 3, 1888 |
| 393,218 | Cummins | Nov. 20, 1888 |
| 449,205 | Clouse | Mar. 31, 1891 |
| 964,632 | De Ferranti | July 19, 1910 |
| 1,324,055 | Lachman | Dec. 9, 1919 |
| 1,837,124 | Hering | Dec. 15, 1931 |
| 1,969,108 | Tarbox | Aug. 7, 1934 |
| 1,973,183 | Tarbox | Sept. 11, 1934 |
| 2,525,219 | Green | Oct. 10, 1950 |